March 8, 1938.  O. A. CARNAHAN  2,110,498
DRINK MIXER
Filed Sept. 6, 1935   2 Sheets-Sheet 1
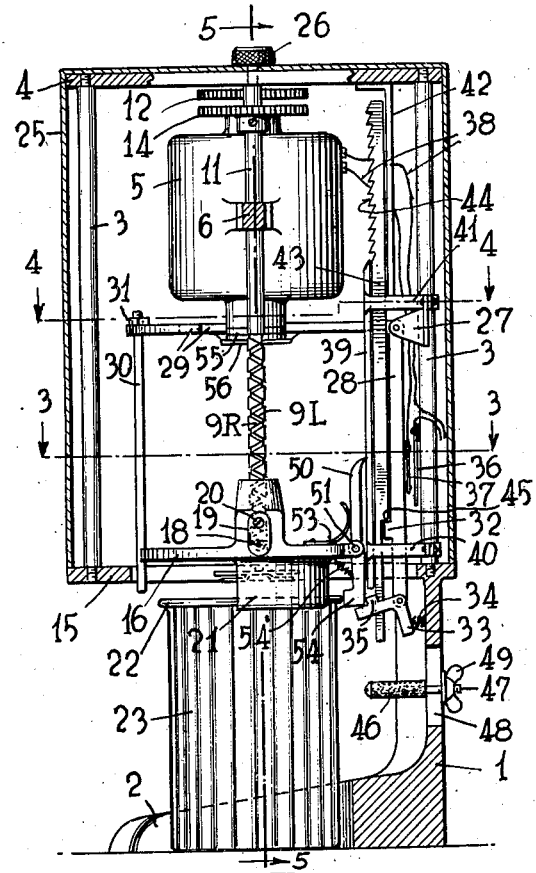
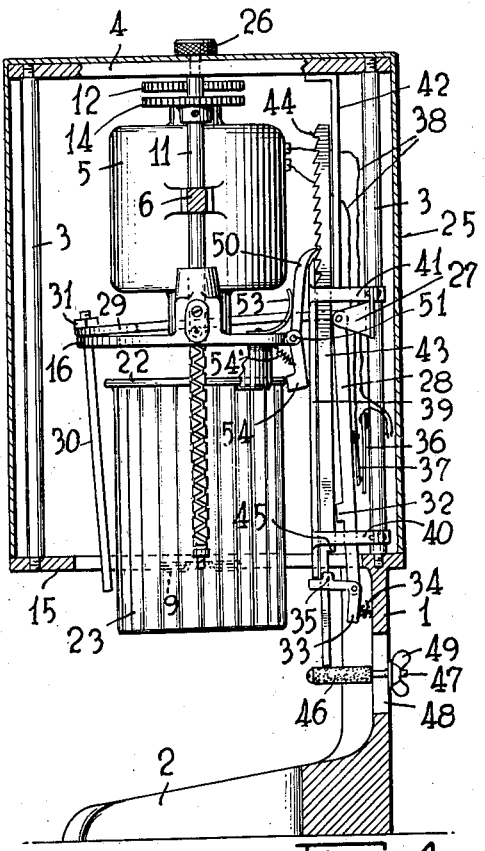
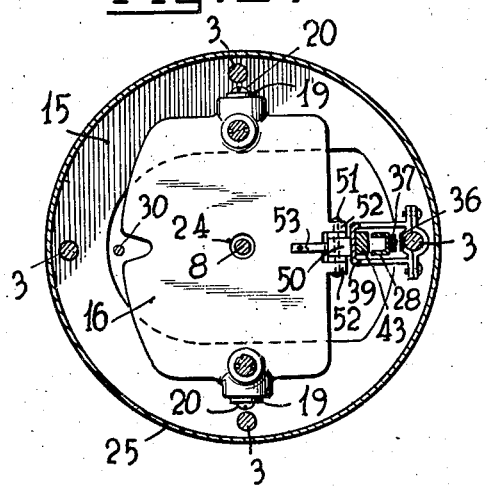
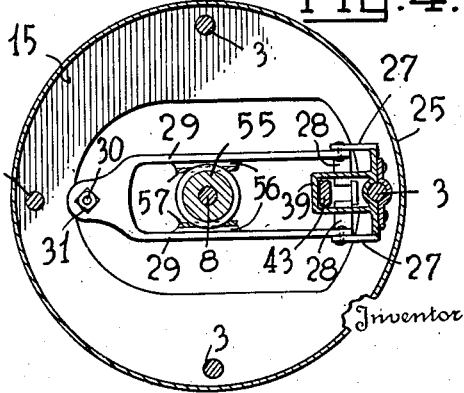
Orson A. Carnahan,
Inventor March 8, 1938.  O. A. CARNAHAN  2,110,498
DRINK MIXER
Filed Sept. 6, 1935   2 Sheets-Sheet 2
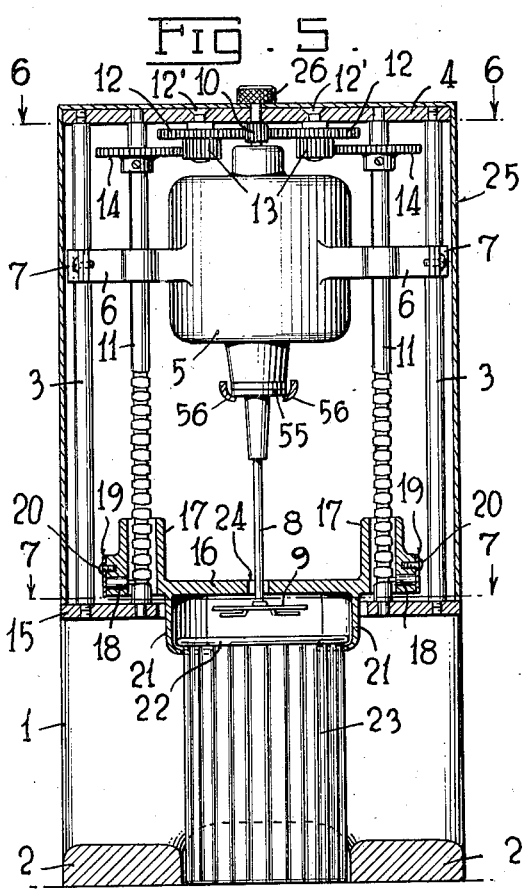
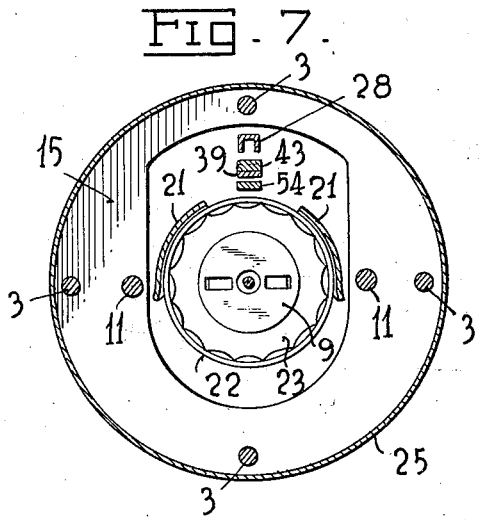
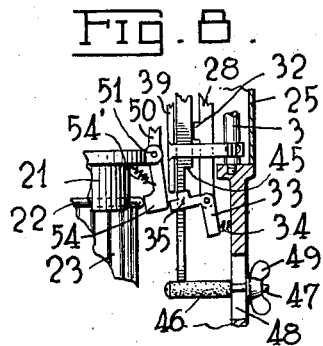
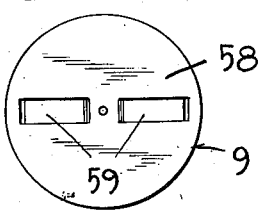
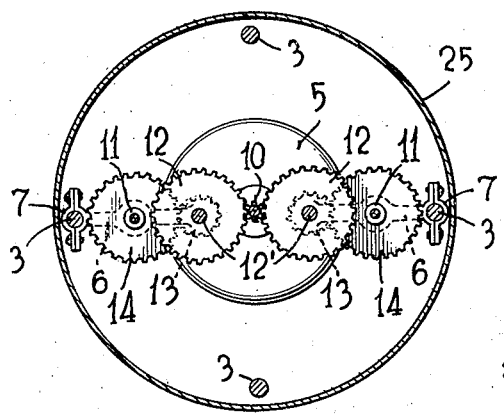
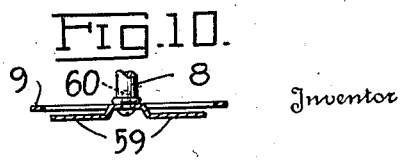
Inventor
Orson A. Carnahan,
By F. Gerald Foye
Attorney Patented Mar. 8, 1938

2,110,498

UNITED STATES PATENT OFFICE 2,110,498

DRINK MIXER

Orson A. Carnahan, Syracuse, N. Y.

Application September 6, 1935, Serial No. 39,481

18 Claims. (Cl. 259—93)

My invention relates to motor driven mixers and particularly to motor driven drink mixers of the type used at soda fountains and the like.

An object of my invention is to provide an improved mixer of this type arranged to operate entirely automatically which is safe, convenient and efficient.

Another object of my invention is to provide an improved mixer in which means is provided for automatically starting the device when a receptacle containing material to be mixed is placed therein and automatically stopping the device when agitation has been completed.

Another object of my invention is to provide an improved mixer having an automatic cycle of operation wherein the agitator is caused to enter the mix, agitate the same and withdraw.

A still further object of my invention is the provision of a mixer of this type so arranged that the agitator will automatically enter the mix, agitate the same and withdraw therefrom a predetermined number of times.

A further object is to provide such a mixer in which the time of agitation may be adjusted.

A further object of my invention is to provide an improved mixer which will automatically cease operation upon completion of the mixing process.

My invention will be better understood from the following description taken in connection with the accompanying drawings, and the features of novelty which characterize my invention will be pointed out with particularity in the claims annexed to and forming a part of this specification.

Figure 1 is a side view partly in section of my improved mixer showing the parts in the position occupied just as the mixing operation has been completed. Figure 2 is a view similar to Fig. 1 showing the container at the top of its stroke. Figure 3 is a section taken on the line 3—3 of Fig. 1. Figure 4 is a section taken on the line 4—4 of Fig. 1. Figure 5 is a front view partly in section on the line 5—5 of Fig. 1. Figure 6 shows a section taken on line 6—6 of Fig. 5. Figure 7 shows a section taken on line 7—7 of Fig. 5. Figure 8 is a fragmentary section showing the position of the control element just as the motor switch is closed. Figure 9 is a plan view of the agitator element. Figure 10 is a side view partly in section of the stem and agitator element.

In its preferred embodiment my mixing device is made up of a main frame element 1 having two feet 2. Supported in spaced relationship above the main frame 1 by means of spacing studs 3 is a top plate 4. An electric motor 5 is mounted by means of supporting arms 6 secured to the spacing studs 3 by clamping members 7. Depending from the motor 5 is a stem 8 carrying an agitator element 9. On the upper end of the motor shaft is a pinion 10 (Figs. 5 and 6) arranged to drive shafts 11 through gears 12, 13 and 14. Gears 12 and 13 are carried on stub shafts 12' mounted in the top plate 4. The shafts 11 are journaled in the top plate 4, the member 15 which as shown is an integral part of frame 1, and the supporting arms 6. Shafts 11 are each provided with a right and a left hand thread 9R and 9L, respectively, extending approximately half way up their length. These threads lead into one another at the top and bottom, respectively. The container support 16 is provided with sleeves 17 surrounding shafts 11. Extending through one side of each of these sleeves is a pin 18 (Fig. 5) arranged to engage the thread on shafts 11. Pins 18 are secured in place by the covers 19 held in place by screws 20. The container support has depending lip members 21 arranged to engage the rim 22 of a container 23. The container 23 is a cylindrical container having fluted or ribbed walls so as to retard the tendency of the mix to whirl upon being agitated.

As more fully shown in Figure 3, the container support 16 serves as a splash shield for the internal parts of the mixer, there being a small opening 24 therein through which the stem 6 extends.

A cup shaped sheet metal or molded plastic cover member 25 is arranged to be slid down over the above assembly into a position where its lower edge rests on member 15. This cover member is secured in place by thumb screw 26 which is threaded into the top plate 4 above pinion 10. Thus removal of the thumb screw 26 and cover 25 exposes the complete mechanism for oiling, cleaning, or repairing.

Pivotally supported on the rear stud 3 by bosses 27 is a bifurcated bell crank lever made up of vertically extending members designated 28 and horizontally extending members 29. Supported from the outer end of members 29 is a pin 30 secured thereto by a nut 31. The vertical portion 28 of the lever has formed thereon a shoulder 32 and carries at its lower end a dog 33 pivotally connected thereto. A compression spring 34 is arranged between the lower end of dog 33 and the frame 1. Dog 33 also carries a shoulder 35. One contact 36 of a control switch is carried by the rear stud 3 and suitably insulated therefrom.

The cooperating contact 37 is carried on the back side of lever 28 and is likewise insulated. This switch is connected in series with the motor leads 38 so as to open and close the motor circuit to control operation of the mixer.

A guide plate 39 is supported by straps 40 and 41, respectively. Straps 41 are formed integrally with bosses 27 which support the bifurcated bell crank lever whereas straps 40 support only the lower end of guide plate 39, both sets of straps being supported by rear stud 26. Another guide plate 42 depends from the top plate and has its lower end supported by straps 41. Supported to slide up and down between said guide plates is a bar 43. The upper end of said bar is notched as indicated at 44 and the lower end thereof is cut away as indicated at 45. A stop 46 is carried by a pin 47 adjustably mounted in a slot 48 in frame 1 and arranged to be secured in adjusted position by means of a wing nut 49.

Carried on the rear edge of the container support 16 is a pawl 50. The pawl 50 is pivotally supported by a rivet 51 passing through bosses 52 on support 16 (Fig. 3). Pawl 50 is urged against the guide plate 39 by a leaf spring 53. Also pivotally supported on rivet 51 and depending therefrom is a lever 54 arranged to be engaged by the rim 22 of container 23. The lever 54 is drawn forward against the container rim 22 by means of a weak spring 54'.

As indicated in Fig. 4, the bifurcated portions 29 of the bell crank lever extend on either side of stem 8. A disc member 55 is mounted on stem 8 to rotate therewith. Lips 56 on portions 29 of the lever have a friction material 57 mounted thereon and are arranged to cooperate with disc 55 to form a brake.

The agitator element more fully illustrated in Figs. 8 and 9 is made up from a flat sheet of metal 58 having ears 59 struck out and bent up so as to form tongues in a different plane from that of main sheet 58. This agitator element 9 is secured to the lower end of stem 8 by a screw 60. The ears 59 form cutting or beating edges and the main plate 58 is not necessarily flat but may be dished if desired.

The operation of my invention is as follows. Fig. 1 shows the parts in the position occupied after the mixing operation has been completed. Removal of the container allows lever 54 to move forward under the bias of spring 54' and outer end of dog 33 to move upward and behind lever 54 until the top of shoulder 35 strikes the lower end of guide 39. Upon again inserting the container the rim 22 thereof bears against lever 54 which in turn pushes against the outer end of dog 33 thus moving it rearwardly compressing spring 34 as shown in Fig. 8. This motion is in turn transmitted through the pivotal connection between member 33 and the vertical portion 28 of the bell crank lever so as to cause the portion 28 to move to the right, thus closing contacts 36 and 37. The closure of contacts 36 and 37 energizes the motor which drives the agitator element 9 through the stem 8 and the shafts 11 through the gearing 10, 12, 13 and 14. When the vertical portion 28 of the lever is thus moved to the right, shoulder 32 is moved out from under the cutaway portion 45 of bar 43. Since bar 43 is free to slide between guides 39 and 42 it drops to the position shown in Fig. 2, coming to rest against the stop 46. In this position it serves to block any subsequent movement of the vertical portion 28 of the lever toward the left until elevated to its initial position again bringing the cutaway portion 45 in front of the shoulder 32.

Upon the energization of the motor 5 the shafts 11 start rotating, thus causing the pins 18 to follow the right hand thread 9R on said shafts to the upper limit of travel. This motion carries the container support 16 upwardly which in turn lifts the container by means of the lips 21. As the container support 16 lifts the container 23 upwardly the agitator element 9 is introduced into the mix to perform the mixing operation. Due to the fact that the container is cylindrical the clearance between the agitator element and the container walls is uniform throughout its stroke. However, a frustro-conical shaped container could also be used but in any event it is preferred to utilize the flutes or ribs shown in Fig. 1 to check the tendency of the mix to rotate.

Upon the initial upward movement of the container support 16, the lever 54 is moved out of contact with dog 33. Due to the bias of spring 34 the left hand end of dog 33 moves upward to bring the shoulder 35 in behind the lower end of guide plate 39 as shown in Fig. 2.

Upon reaching the upper limit of travel the pawl 50 rides over the upper end of the guide plate 39 into contact with one of the teeth 44, thus moving bar 43 upwardly one notch before the follower pins 18 ride from the right hand thread 9R into the left hand thread 9L and start to descend. Bar 43 is maintained in position after being thus notched upwardly due to the friction between it and the shoulder 32. Thus, the container support 16 goes through a stroke upwardly and downwardly and as this continues the bar 43 is progressively raised by the notching operation to its initial position as shown in Fig. 1. As the pawl 50 moves this bar 43 the last notch, the shoulder 32 again moves opposite cutaway portion 45 of bar 43, and moves to the left slightly thus holding bar 43 in its raised position but does not move far enough to open the contacts 36 and 37. Were it not for the fact that the shoulder 35 is positioned behind the lower end of guide plate 39, the vertical portion 28 of the bell crank lever would move all the way to the left, thus opening the contacts. However, the dog 33 is restrained from moving to all the way to the left because the shoulder 35 strikes the lower end of guide plate 39 and remains there until the container support 16 descends to the lower limit of its last stroke. Upon reaching the bottom of this last stroke, the lever 54 strikes top of outer end of dog 33, moving it downwardly and thus releasing the shoulder 35 from behind the lower end of guide plate 39. At this time the spring 34 urges dog 33 to the left, carrying with it the vertical portion 28 of the bell crank lever, thus opening contacts 36 and 37 and deenergizing the motor. This leaves the outer end of dog 33 underneath lever 54 as shown in Fig. 1.

Thus, it will be seen that by suitably adjusting the position of stop 46 the distance which bar 43 will drop upon being freed from the shoulder 32 can be predetermined. If stop 46 has been adjusted to its uppermost position, the cutaway portion 45 will not fall below the shoulder 32 so that a single stroke of the container will complete a cycle. In other words, the number of notches necessary to raise the bar to its initial position can be predetermined and, consequently, the number of strokes of the container support 16. For example, in mixing heavy drinks containing crushed fruit, ice cream and the like, the number of strokes should be increased in order to prolong the mixing operation and to present the agitator element 9 a number of times to all parts of the mix. On the other hand, in mixing lighter drinks, such as hot chocolate and the like, one or two strokes may be sufficient.

When the cup is moved into its initial position, forcing the vertical portion 28 of the bell crank lever to the right and closing contacts 36 and 37, the portions 29 of the lever are caused to move downwardly, thus moving lips 56 and their associated friction faces 57 out of contact with disc 55. This leaves the motor free to rotate. At the same time the lower end of pin 30 is dropped downwardly in front of the rim 22 of the container 23, thus preventing its removal while the motor is energized. Upon completion of the last stroke of the support 16 and the de-energization of the motor, the portions 29 of the lever again move upwardly to bring the friction faces 27 into contact with disc 55, thus performing a braking action on the motor so as to quickly bring the whole mechanism to rest with the container 23 at the lowest point of its travel. The same movement of the lever lifts the lower end of pin 30 out of the way of the container 23 and permits its removal.

Applicant's novel agitator element 7 is especially well adapted for a drink mixer of the type wherein the agitator is moved through the mix to agitate different portions thereof. The edges of the tongues 59 form beating or cutting edges which are very efficient in pulverizing fruits or heavy ice cream so as to obtain a thorough mix.

While I have shown and described a preferred embodiment of my invention, it will be understood that my invention is not limited to the case where a right and left hand screw threaded translating mechanism is used but obviously includes other means for oscillating the container support as, for example, a single threaded screw with a reversing switch for the motor actuated by stops at the limit of travel. It is also obvious that the parts might be reversed to cause the motor and agitator to be lowered into the mix instead of elevating the container.

What I claim as new and desire to secure by Letters Patent of the United States is:

1. In a mixing device, a stem having an agitator element, a motor for driving said stem, a container, means controlled by said container for controlling said motor, a shaft driven by said motor having a screw thread and means for positively moving said container into and out of operative position relative to said agitator element a predetermined plurality of times including means for cooperating with said thread.

2. In a mixing device, an agitator, a motor for driving said agitator, a container, means controlled by said container for controlling said motor, a shaft driven by said motor having a right and left hand screw thread, and means for cooperating with said thread to positively move said container into and out of operative position relative to said agitator a predetermined plurality of times.

3. In a mixing device, a stem having an agitator element, a motor for driving said stem, a container, a shaft driven by said motor having a screw thread, means for cooperating with said thread to positively move said container into and out of operative position relative to said agitator element a predetermined plurality of times including a switch for controlling said motor arranged to be closed by the positioning of the container in its initial position.

4. In a mixing device, an agitator, a motor for driving said agitator, a container, a shaft driven by said motor having a right and a left hand screw thread, means for cooperating with said thread to positively move said container from an initial position into and out of operative position relative to said agitator a predetermined plurality of times including a switch for controlling said motor arranged to be closed by the positioning of the container in its initial position and to be opened by the return of said container from its operative position relative to said agitator upon completion of said predetermined plurality of times.

5. In a mixing device, a motor, an agitator driven by said motor, a container, means responsive to actuation of said agitator for positively moving one of said two last mentioned elements into and out of operative relationship with respect to the other, a switch for controlling said motor, means for maintaining said switch in its closed position, said means being progressively moved to an ineffective position by each movement of said element into operative position and means for maintaining said switch closed after said last mentioned means has been rendered ineffective until said element is returned from its operative position.

6. In a mixing device, an agitator, a motor for driving said agitator, a container, a shaft driven by said motor having a right and left hand screw thread, and means for cooperating with said thread to move said container into and out of operative position relative to said agitator, a switch normally biased to its open position for controlling said motor and arranged to be closed by the initial positioning of the container, means for maintaining said switch in its closed position and means responsive to each stroke of said first mentioned means for progressively moving said last mentioned means to an ineffective position.

7. In a mixing device, an agitator, a motor for driving said agitator, a container, a shaft driven by said motor having a right and left hand screw thread, and means for cooperating with said thread to move said container into and out of operative position relative to said agitator, a switch for controlling said motor arranged to be closed by the initial positioning of the container, means for maintaining said switch in its closed position, means responsive to each stroke of said first mentioned means for progressively moving said last mentioned means to an ineffective position and means for maintaining said switch closed after said means has been rendered ineffective until said container returns from its operative position relative to said agitator.

8. In a mixing device, an agitator, means for actuating said agitator, a container, means responsive to actuation of said agitator for moving said container into and out of operative position relative to said agitator a predetermined number of times and means for preventing removal of the container until said predetermined number of movements is completed.

9. In a mixing device, a stem having an agitator element, a motor for driving said stem, a container, a shaft driven by said motor having a screw thread, a container support carried by said thread for positively moving said container into and out of operative position relative to said agitator element a predetermined plurality of times and means controlled by said container in said support and responsive to the actuation of said shaft for terminating the operation of said motor upon completion of said predetermined plurality of times.

10. In a mixing device, an agitator, a motor for driving said agitator, a container support, a shaft driven by said motor having a right and left hand screw thread, means cooperating with said thread for positively moving said container support into and out of operative position relative to said agitator, and means carried by said support adapted to be controlled by a container placed therein for effecting the energization of said motor and subsequent de-energization of said motor after a predetermined time.

11. In a mixing device, an agitator, a motor for driving said agitator, a shaft driven by said motor having a right and left hand screw thread, a container support carried by said thread into and out of operative position relative to said agitator, means carried by said support adapted to be controlled by a container placed thereon for effecting the energization of the motor, and means progressively moved upon the actuation of said support for effecting the de-energization of said motor after a predetermined adjustable time.

12. In a mixing device, a stem having an agitator element, a motor for driving said stem, a container, a container support, a shaft driven by said motor having a screw thread, means for cooperating with said thread to positively move said container into and out of operative position relative to said agitator element a predetermined plurality of times including a switch for controlling said motor arranged to be closed by the positioning of the container in the support and means carried by said container support and controlled by said container for causing the opening of said switch after said plurality of times.

13. In a mixing machine, an agitator, a motor for actuating said agitator, a container, a support therefor, means responsive to actuation of said motor for positively moving said container into and out of operative position relative to said agitator, means adapted to be set to control the duration of operation of said motor so as to move said container into and out of said operative position a predetermined plurality of times and means responsive to the positioning of said container on said support for setting said control means.

14. In a mixing machine, an agitator, a motor for actuating said agitator, a container, a support therefor, means responsive to actuation of said motor for positively moving said container into and out of operative position relative to said agitator, means adapted to be set to control the duration of operation of said motor so as to move said container into and out of said operative position a predetermined plurality of times, means responsive to the positioning of said container on said support for setting said control means and means preventing removal of said container from said machine until after said predetermined plurality of movements.

15. In a mixing machine, an agitator, a motor for actuating said agitator, a container, a support therefor, means responsive to actuation of said motor for positively moving said container and said agitator into and out of operative position relative to each other, means adapted to be set to control the duration of operation of said motor so as to move said container and said agitator into and out of said relative operative position a predetermined plurality of times and means responsive to the positioning of said container on said support for setting said control means.

16. In a mixing machine, an agitator, a motor for actuating said agitator, a container, a support therefor, means responsive to actuation of said motor for positively moving said container into and out of operative position relative to said agitator, adjustable means adapted to be set to control the duration of operation of said motor so as to move said container into and out of said operative position a predetermined plurality of times and means responsive to the positioning of said container on said support for setting said control means.

17. In a mixing machine, an agitator, a motor for actuating said agitator, a container, a container support, means responsive to the actuation of said motor for moving said container support into and out of operative position relative to said agitator, and means including a member carried by said support and responsive to the position of said container with respect to said support for effecting the energization of said motor and subsequent deenergization thereof after a predetermined number of movements of said container support.

18. In a mixing machine, an agitator, a motor for actuating said agitator, a container, a container support, means responsive to the actuation of said motor for moving said container support into and out of operative position relative to said agitator, means including a member carried by said support and responsive to the position of said container with respect to said support for effecting the energization of said motor and subsequent deenergization thereof after a predetermined number of movements of said container support and means actuated by said last mentioned means for preventing the removal of said container from said support until after said predetermined number of movements.

ORSON A. CARNAHAN.